(12) United States Patent
Lee

(10) Patent No.: US 11,061,486 B2
(45) Date of Patent: Jul. 13, 2021

(54) METHOD AND APPARATUS FOR QUANTIFYING BUTTON CLICK FORCE

(71) Applicant: RAZER (ASIA-PACIFIC) PTE. LTD., Singapore (SG)

(72) Inventor: Kah Yong Lee, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/610,546

(22) PCT Filed: May 12, 2017

(86) PCT No.: PCT/SG2017/050251
§ 371 (c)(1),
(2) Date: Nov. 4, 2019

(87) PCT Pub. No.: WO2018/208225
PCT Pub. Date: Nov. 15, 2018

(65) Prior Publication Data
US 2020/0057511 A1    Feb. 20, 2020

(51) Int. Cl.
*G06F 3/038* (2013.01)
*G06F 3/01* (2006.01)
*G06F 3/0354* (2013.01)

(52) U.S. Cl.
CPC .......... *G06F 3/03543* (2013.01); *G06F 3/016* (2013.01); *G06F 3/0383* (2013.01);
(Continued)

(58) Field of Classification Search
CPC ........ G06F 3/0383; G06F 3/016; G06F 3/038; G06F 3/03549; G06F 3/03543;
(Continued)

(56) References Cited

U.S. PATENT DOCUMENTS 5,995,026 A   11/1999  Sellers
6,758,615 B2   7/2004  Monney et al.
(Continued)

FOREIGN PATENT DOCUMENTS

CN    103197860 A  *  7/2013  .......... G06F 3/0346

OTHER PUBLICATIONS

International Search Report and Written Opinion, dated Feb. 1, 2018, for the corresponding International Application No. PCT/SG2017/050251 in 12 pages.
(Continued)

*Primary Examiner* — Darlene M Ritchie
(74) *Attorney, Agent, or Firm* — Polsinelli PC

(57) ABSTRACT

A method, a computer-readable medium, and an apparatus for adjusting feedback parameters are provided. The apparatus may determine a duration of pressing a button of an input device based on a signal associated with the button. To determine the duration of pressing the button, the apparatus may calculate the duration based on a start time and an end time. The start time may be a first time instance at which the button is pressed and the end time may be a second time instance at which the pressed button is released. The apparatus may classify the press force applied on the button of the input device into a category of a plurality of categories based on the duration. The apparatus may adjust a parameter of a feedback corresponding to the press force based on the category. The apparatus may control the feedback based on the parameter.

16 Claims, 7 Drawing Sheets

(52) U.S. Cl.
CPC ...... *G06F 3/03547* (2013.01); *G06F 3/03549* (2013.01); *G06F 2203/0337* (2013.01)

(58) Field of Classification Search
CPC ......... G06F 3/03547; G06F 2203/0337; G06F 3/0354; G06F 3/03541
See application file for complete search history.

(56) References Cited

U.S. PATENT DOCUMENTS

| | | | |
|---|---|---|---|
| 7,123,241 B2 | 10/2006 | Bathiche | |
| 7,256,768 B2 | 8/2007 | Bathiche | |
| 7,728,819 B2* | 6/2010 | Inokawa | G06F 3/03547 345/173 |
| 9,035,752 B2* | 5/2015 | Rosenberg | G06F 1/1684 340/407.2 |
| 9,417,708 B2 | 8/2016 | Aull et al. | |
| 9,448,631 B2 | 9/2016 | Winter et al. | |
| 9,513,707 B2 | 12/2016 | Lisseman et al. | |
| 2005/0156892 A1 | 7/2005 | Grant | |
| 2009/0135164 A1 | 5/2009 | Kyung et al. | |
| 2009/0322695 A1 | 12/2009 | Cho et al. | |
| 2011/0242029 A1 | 10/2011 | Kasahara et al. | |
| 2012/0182231 A1* | 7/2012 | Lin | G06F 3/038 345/173 |
| 2015/0301613 A1 | 10/2015 | Yanev et al. | |
| 2016/0306428 A1 | 10/2016 | Fleizach et al. | |
| 2017/0068513 A1* | 3/2017 | Stasior | G10L 15/32 |
| 2017/0076489 A1* | 3/2017 | Fleureau | A63F 13/426 |
| 2017/0083096 A1 | 3/2017 | Rihn et al. | |
| 2017/0123568 A1* | 5/2017 | Takeda | G06F 3/044 |
| 2018/0067554 A1* | 3/2018 | Chaudhri | G06F 3/0485 |
| 2018/0164883 A1* | 6/2018 | Higgins | G06F 3/0227 |
| 2018/0275756 A1* | 9/2018 | Rai | G06F 3/04886 |
| 2019/0163308 A1* | 5/2019 | Wang | G06F 1/1671 |
| 2020/0050326 A1* | 2/2020 | Kim | G06F 3/044 |

OTHER PUBLICATIONS

Topi Kaaresoja, et al., Playing with Tactile Feedback Latency in Touchscreen Interaction: Two Approaches. Human-Computer Interaction—INTERACT 2011. Proceedings 13th IFIP TC 13 International Conference, 554-71, 2011, Springer, Berlin, Heidelberg.
Extended European Search Report dated Mar. 27, 2020, 7 pages, for the corresponding European Patent Application No. 17 909 419.8.

* cited by examiner

METHOD AND APPARATUS FOR QUANTIFYING BUTTON CLICK FORCE

TECHNICAL FIELD

Various aspects of this disclosure generally relate to human-computer interaction, and more particularly, to quantifying input device button click force.

BACKGROUND

Computing technology has seen a many-fold increase in capability ever since it was created. Processors work at ever higher rates; memories are ever larger and always faster; mass storage is larger and cheaper every year. Computers now are essential elements in many aspects of life, and are often used to present three-dimensional worlds to users, in everything from games to scientific visualization.

Human-computer interaction (HCI) researches the design and use of computer technology, focused on the interfaces between humans (users) and computers. Humans interact with computers in many ways. The interface between humans and computers is crucial to facilitating this interaction. The interface between the user and the computer has not seen the same rate of change as the computing technology. For example, screen windows, keyboard, monitor, and mouse are the standard, and have seen little change since their introduction. Little thought is given to the human-computer interface, although most of the user's experience with the computer is dominated by the interface between the user and the computer.

As computers continue to increase in capability, the human-computer interface becomes increasingly important. The effective bandwidth of communication with the user is not sufficient using only the traditional mouse and keyboard for input and monitor and speakers for output. More capable interface support is desirable to accommodate more complex and demanding applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For human-computer interaction, the tactile and/or lighting feedback may provide an enhanced user and gaming experience. The lighting feedback may be synchronized with a plurality of lighting devices (e.g., addressable LED lighting devices) for each type of click forces. For example, for a hard click force, lighting feedback on the lighting devices on mouse and/or keyboard and/or mouse pad may be deeper in color intensity and longer in duration as compared to a soft click force, which provides a light color intensity and short duration light feedback.

In an aspect of the disclosure, a method, a computer-readable medium, and an apparatus for adjusting feedback parameters are provided. The apparatus may determine a duration of pressing a button of an input device based on a signal associated with the button. To determine the duration of pressing the button, the apparatus may calculate the duration based on a start time and an end time. The start time may be a first time instance at which the button is pressed and the end time may be a second time instance at which the pressed button is released. The apparatus may classify the press force applied on the button of the input device into a category of a plurality of categories based on the duration. The apparatus may adjust a parameter of a feedback corresponding to the press force based on the category. The apparatus may control the feedback based on the parameter.

In one aspect, the plurality of categories may include a first category, a second category, and a third category. The press force may be classified into the first category when the duration is shorter than a first threshold. The press force may be classified into the third category when the duration is longer than a second threshold. The second threshold may be greater than the first threshold. The press force may be classified into the second category when the duration is longer than or equal to the first threshold but shorter than or equal to the second threshold.

In one aspect, the feedback may be at least one of a haptic feedback or a lighting feedback. The parameter may be at least one of the vibration intensity of the haptic feedback, the color intensity of the lighting feedback, or the light duration of the lighting feedback.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1B:
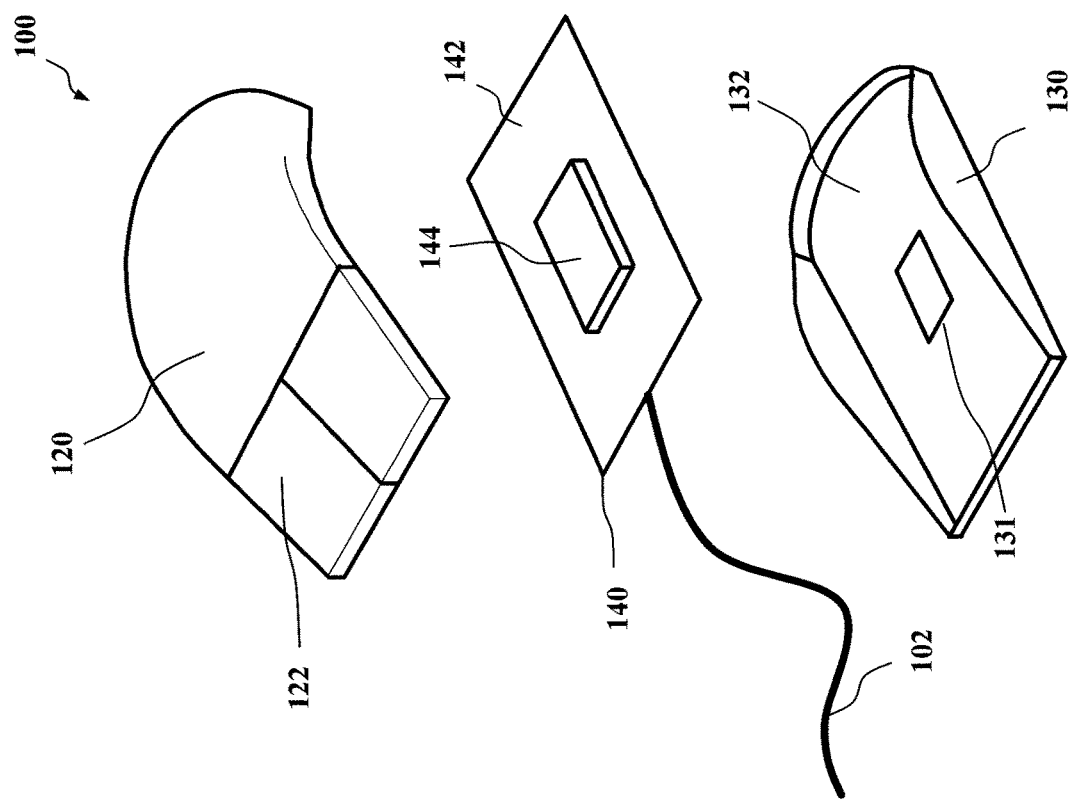
FIG. 1B is a diagram showing an exploded view of the mouse of FIG. 1A according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of human-computer interaction will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

To enhance user experience, in one embodiment, the click force to a button on an input device (e.g., mouse) may be quantified to soft, medium, and hard. The click force may correspond to a desired lighting condition as a form of feedback indicator or haptic feedback (in the form of intensity of vibration force). The feedback engine (e.g. lighting) may use the quantified value of the click force to set the light accordingly. For instance, the light may be set to light green for a soft click, the light may be set to normal green for medium click, and the light may be set to dark green for hard click. Similarly for haptic feedback, the click force may be used as a parameter to control the intensity of the vibration force (feedback). For example, the harder the click force, the higher the intensity of the vibration force.

Figure 1A:
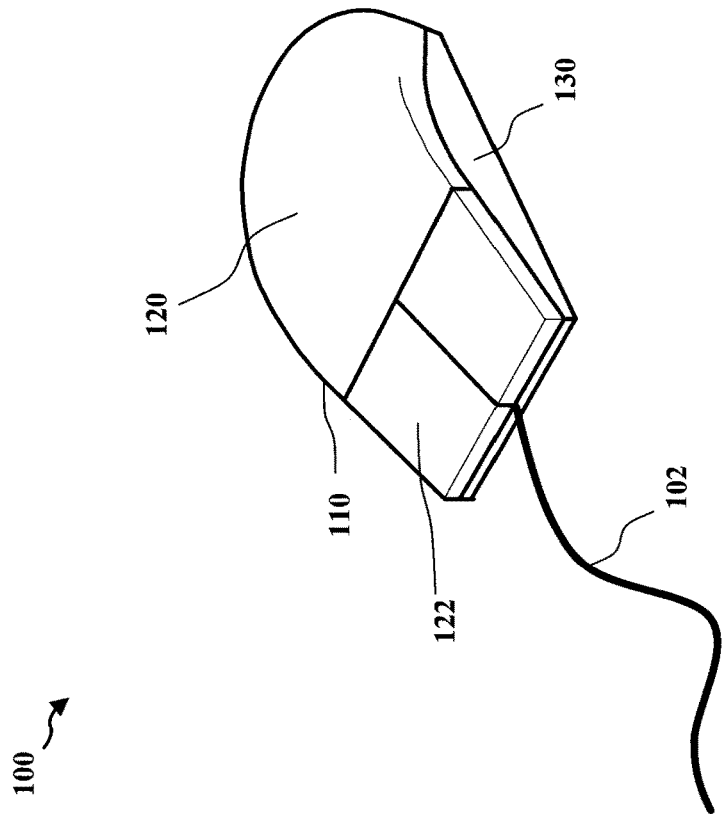
FIG. 1A is a diagram showing an assembled view of a mouse for communication with a processor-based device according to various embodiments.

FIG. 1A is a diagram showing an assembled view of a mouse 100 for communication with a processor-based device according to various embodiments. FIG. 1B is a diagram showing an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, to which the mouse 100 may be connected, via clicking of the one or more buttons 122 of the mouse 100. The one or more buttons 122 may include a click button, or a scroll button, or a push button, or any combination of suitable buttons. The one or more buttons 122 may be located at any region of the cover portion 120 as desired.

According to various embodiments, the housing 110 may include a base surface. The base surface may be configured to face a tracking surface on which the mouse 100 may be placed on. Accordingly, the base surface of the housing 110 may be an exterior surface of a substantially flat section 132 of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

Figure 2:
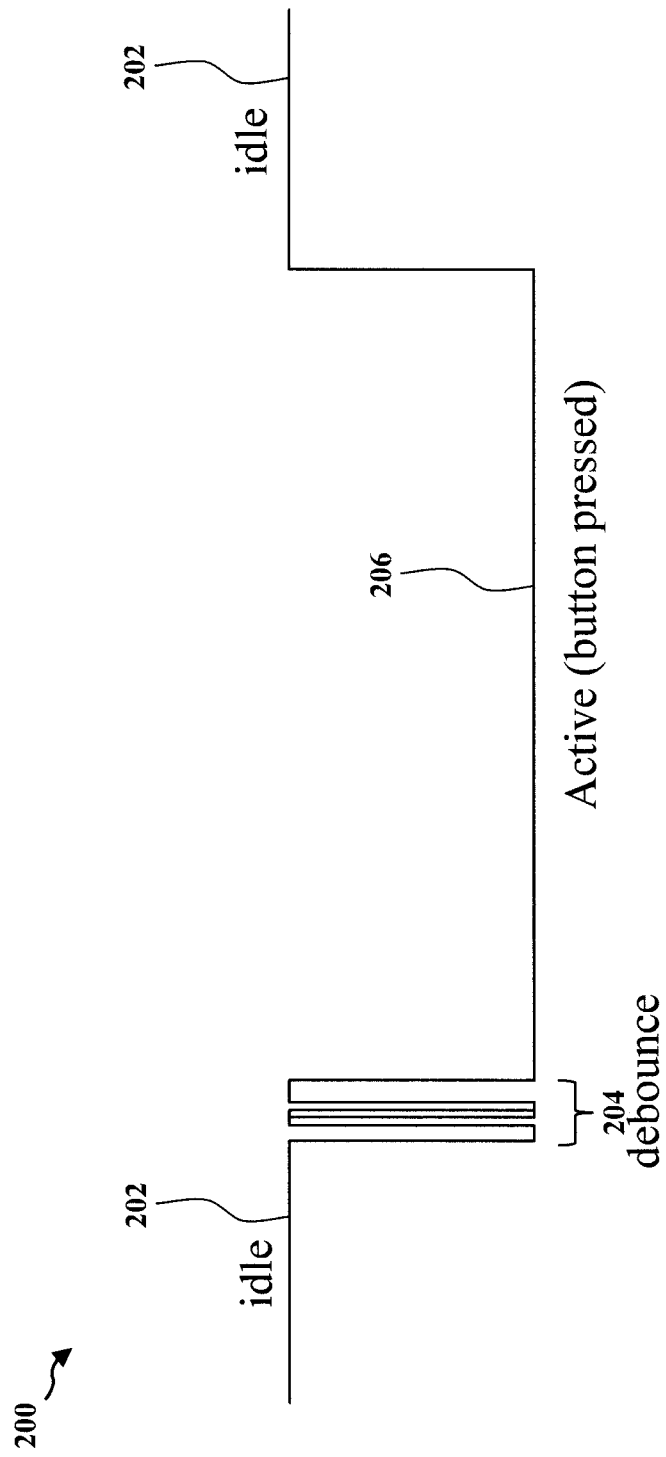
FIG. 2 is a diagram illustrating an example of a mouse button click signal.

FIG. 2 is a diagram illustrating an example of a mouse button click signal 200. In one embodiment, the mouse button click signal 200 may reflect a signal produced by a mouse regarding a button of the mouse. In one embodiment, the mouse button click signal 200 may be an analogue signal. In another embodiment, the mouse button click signal 200 may be a digital signal. In this example, the mouse button click signal 200 starts at an idle state 202 when the button is not pressed. When the button is pressed, the mouse button click signal 200 enters into a debounce period 204. During the debounce period 204, switch and relay contacts related to the mouse button strike together, the momentum and elasticity of the contacts act together to cause the contacts to bounce apart one or more times before making steady contact. The result is a rapidly pulsed electric current instead of a clean transition from the idle state 202 to an active state 206. After the debounce period 204 ends, the mouse button click signal 200 enters into the active state 206, at which the button is continuously pressed. When the pressed button is released, the mouse button click signal 200 switches back to the idle state 202.

Figure 3:
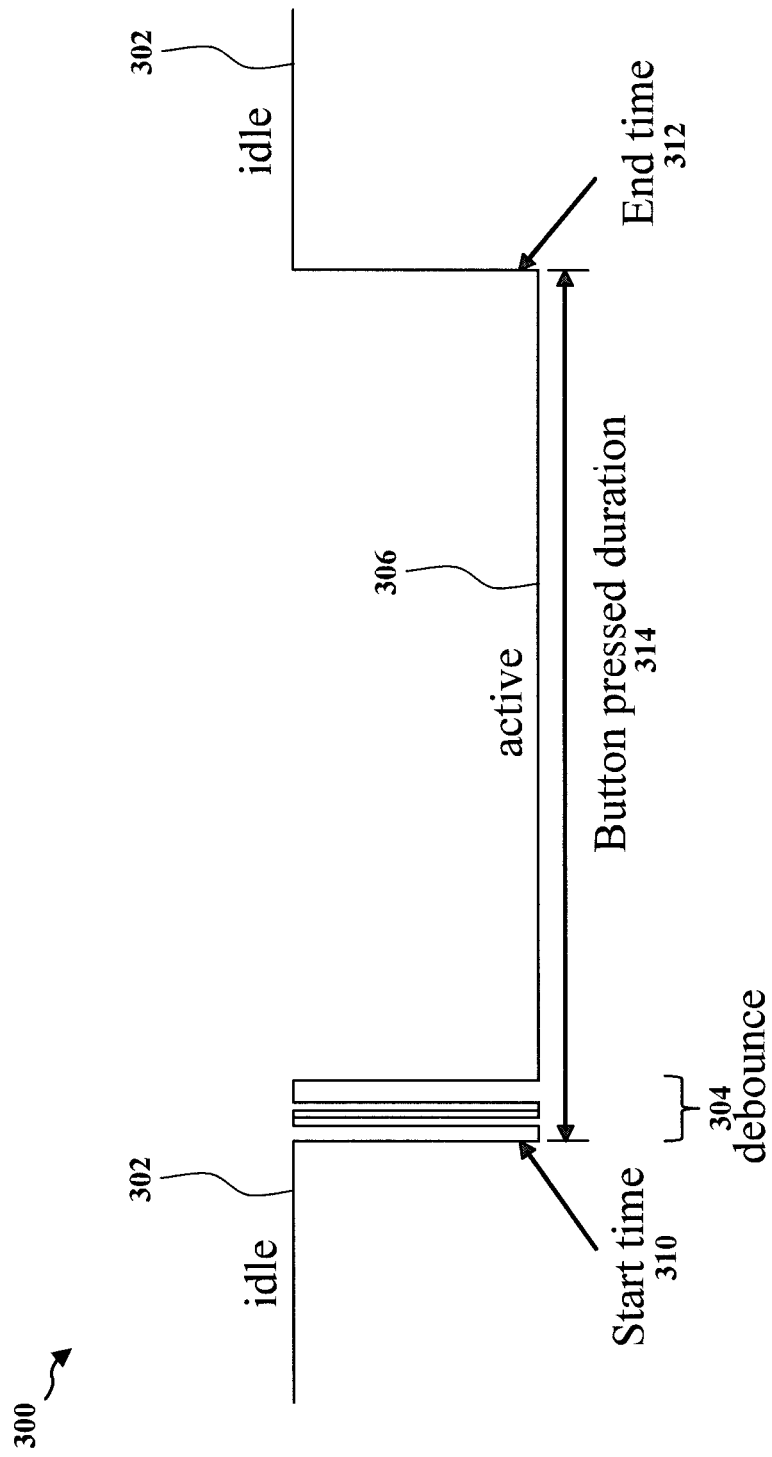
FIG. 3 is a diagram illustrating an example of calculating a mouse button pressed duration based on a mouse button click signal.

FIG. 3 is a diagram illustrating an example of calculating a mouse button pressed duration 314 based on a mouse button click signal 300. In one embodiment, the mouse button click signal 300 may be the mouse button click signal 200 described above in FIG. 2 and reflect a signal produced by a mouse regarding a mouse button. In this example, the mouse button click signal 300 starts at an idle state 302 when the button is not pressed. When the button is pressed at the start time 310, the mouse button click signal 300 enters into a debounce period 304. After the debounce period 304 ends, the mouse button click signal 300 enters into the active state 306, at which the button is continuously pressed. When the pressed button is released at the end time 312, the mouse button click signal 300 switches back to the idle state 302.

In one embodiment, the mouse button pressed duration 314 is calculated based on the start time 310 and the end time 312. As a result, the mouse button pressed duration 314 may include the debounce period 304 and the period during which the mouse button click signal 300 remains at the active state 306.

In one embodiment, movement of the mouse may automatically trigger the end time 312, regardless whether the button is released or not. In one embodiment, the calculation of the mouse button pressed duration 314 may take place in the microcontroller of the mouse (e.g., within the electronic circuit module 142) or a device driver of a processor-based device connected to the mouse. The device driver may be a computer program that operates or controls the mouse.

In one embodiment, the button pressed duration 314 may be used to quantify the button click force as soft (e.g., corresponding to relatively short button pressed duration), medium (e.g., corresponding to relatively medium button pressed duration), or hard (e.g., corresponding to relatively long button pressed duration). The quantified click forces may correspond to both haptic feedback and lighting feedback applications. For example, the button click force may be quantified as soft if the button pressed duration 314 is shorter than a first threshold (e.g., 100 ms), as hard if the button pressed duration 314 is longer than a second threshold (e.g., 300 ms), or as medium if the button pressed duration 314 is between 100 ms and 300 ms, inclusive.

In one embodiment, users may configure the thresholds for quantifying different categories (e.g., soft, medium, or hard) of click forces via a configuration software or device driver for both haptic feedback and lighting feedback options. In one embodiment, machine-based learning (e.g., through playing of games or click data retrieved from a data collection software) may enable the mouse to adapt to user's click preferences over a certain time period. This enables the mouse to learn and adapt to the user's click force preferences and to determine each of the types of click forces that correspond to the time for each type of click.

In one embodiment, the thresholds for quantifying different categories (e.g., soft, medium, or hard) of click forces may be determined based on statistical distribution of past button pressed durations. For example, if the longest button pressed duration among 20% of the past clicks that have the shortest button pressed durations is 100 ms, a button click force may be quantified as soft if the button pressed duration 314 is shorter than a 100 ms. If the shortest button pressed duration among 20% of the past clicks that have the longest button pressed durations is 300 ms, a button click force may be quantified as hard if the button pressed duration 314 is longer than a 300 ms. And a button click force may be quantified as medium if the button pressed duration 314 is between 100 ms and 300 ms, inclusive.

Figure 4:
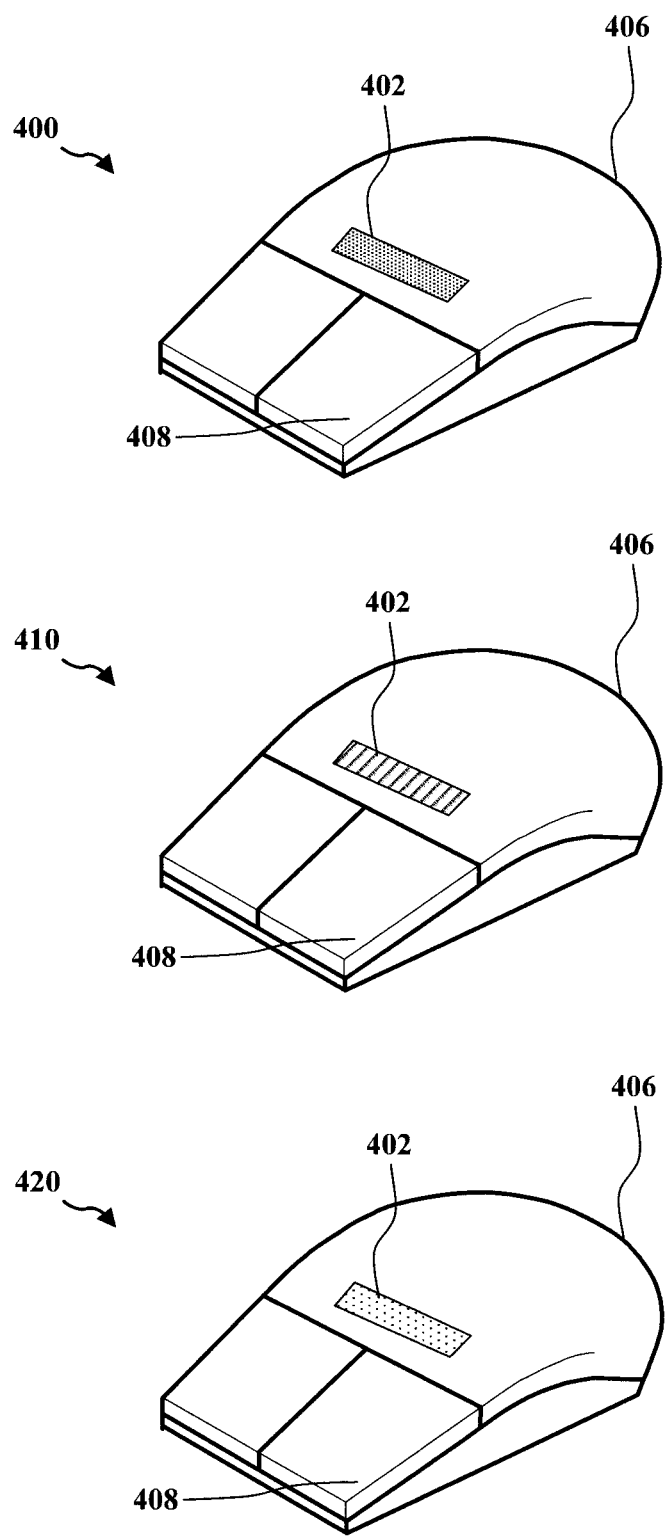
FIG. 4 illustrates an example of providing different lighting feedbacks corresponding to different quantified values of the button click force.

Once the button click force is quantified, corresponding lighting or haptic feedback may be configured and provided. FIG. 4 illustrates an example of providing different lighting feedbacks corresponding to different quantified values of the button click force. As illustrated in diagram 400, a mouse 406 includes a lighting device 402 and a button 408. If the click force on the button 408 is quantified as hard, the lighting device 402 may be configured to display a darker color. If the click force on the button 408 is quantified as soft, the lighting device 402 may be configured to display a lighter color, as illustrated in diagram 420. If the click force on the button 408 is quantified as medium, the lighting device 402 may be configured to display a color with intensity that is between the darker color and the lighter color, as illustrated in diagram 410. By providing multi-layer haptic tactile feedback or lighting feedback, user and gaming experience may be enhanced.

Figure 5:
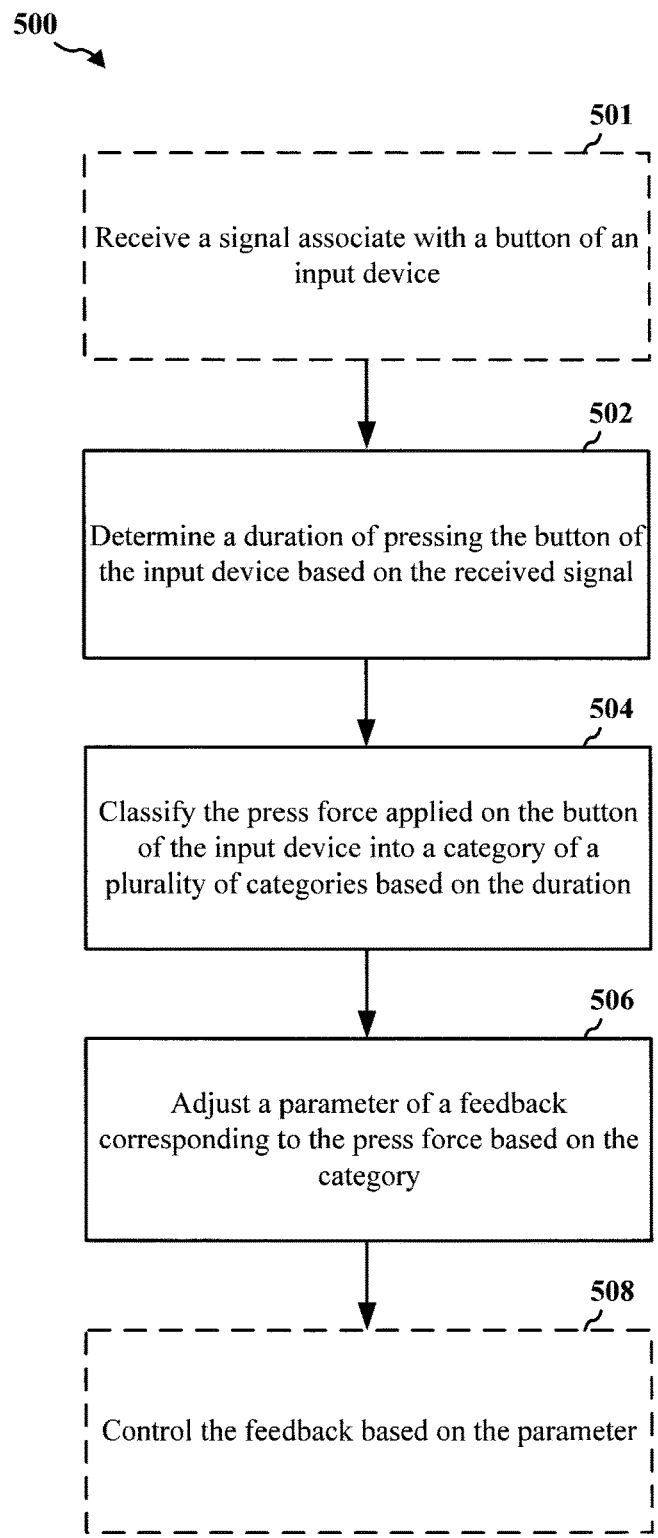
FIG. 5 is a flowchart of a method of quantifying a press force applied on a button of an input device.

FIG. 5 is a flowchart 500 of a method of quantifying a press force applied on a button of an input device. In one embodiment, the input device may be a pointing device, which may be one of a mouse, a trackball, a joystick, a WiiMote, or a touchpad. The method may be performed by the input device or a processor-based device coupled to the input device (e.g., the mouse 100, 406, or the apparatus 602/602').

At 501, the device may optionally receive a signal associated with a button of an input device. In one embodiment, the signal may be the mouse button click signal 200 or 300 described above with reference to FIG. 2 or 3, respectively.

At 502, the device may determine the duration of pressing the button of the input device based on the received signal. In one embodiment, the duration may be determined without using a sensor to detect the press force. The sensor for detecting the press force may be any suitable tactile sensor including, a mechanical sensor, a resistive sensor, a capacitive sensor, a magnetic sensor, an optical fiber sensor, a piezoelectric sensor, a silicon sensor, and/or a temperature sensor.

In one embodiment, to determine the duration of pressing the button, the device may calculate the duration based on a start time and an end time. The start time may be a first time instance at which the button is pressed and the end time may be a second time instance at which the pressed button is released, as described above with reference to FIG. 3. In one embodiment, a movement of the input device may trigger the end time regardless whether the pressed button is released. In one embodiment, the calculating of the duration may be performed by a microcontroller of the input device or by a program running on a computing device coupled to the input device.

At 504, the device may classify the press force applied on the button of the input device into a category of a plurality of categories based on the duration. In one embodiment, the plurality of categories may include a first category, a second category, and a third category. The press force may be classified into the first category when the duration is shorter than a first threshold. The press force may be classified into the third category when the duration is longer than a second threshold. The second threshold may be greater than the first threshold. The press force may be classified into the second category when the duration is longer than or equal to the first threshold but shorter than or equal to the second threshold. In one embodiment, at least one of the first threshold and the second threshold may be pre-determined (e.g., by users and/or manufacturer), configurable (e.g., by users), or adaptable through machine-based learning.

At 506, the device may adjust a parameter of a feedback corresponding to the press force based on the category. In one embodiment, the feedback may be at least one of a haptic feedback or a lighting feedback. The parameter may be at least one of a vibration intensity of the haptic feedback, a color intensity of the lighting feedback, or a light duration of the lighting feedback. For example, if the press force is classified into the third category, the parameter may be adjusted to a value corresponding to high intensity of vibration, or high color intensity of lighting, or longer duration of lighting. Similarly, if the press force is classified into the first category, the parameter may be adjusted to a value corresponding to low intensity of vibration, or low color intensity of lighting, or shorter duration of lighting.

At 508, the device may optionally control the feedback based on the parameter. For example, the device may control the light duration and/or color intensity of the lighting feedback based on the parameter, or the device may control the vibration intensity of the haptic feedback based on the parameter.

Figure 6:
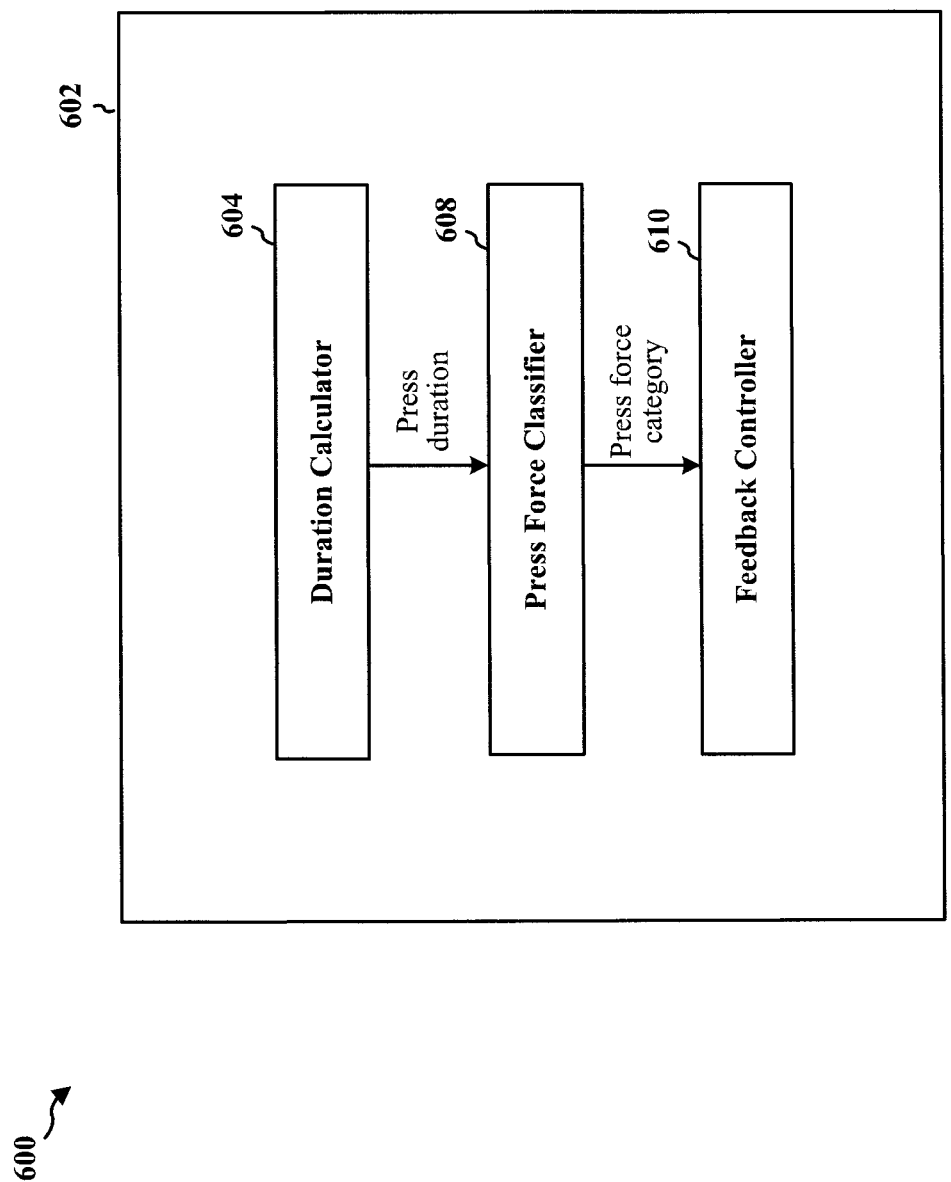
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus 602 may be an input device or a computing device coupled to the input device. The apparatus 602 may include a duration calculator 604 that determines the pressed duration of a button of the input device. In one embodiment, the duration calculator 604 may perform the operations described above with reference to 502 in FIG. 5.

The apparatus 602 may include a press force classifier 608 that classifies the press force into a press force category based on the press duration received from the duration calculator 604. In one embodiment, the press force classifier 608 may perform the operations described above with reference to 504 in FIG. 5.

The apparatus 602 may include a feedback controller 610 that adjusts a feedback parameter corresponding to the press force based on the press force category and controls the feedback based on the feedback parameter. In one embodiment, the p feedback controller 610 may perform the operations described above with reference to 506 or 508 in FIG. 5.

The apparatus 602 may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
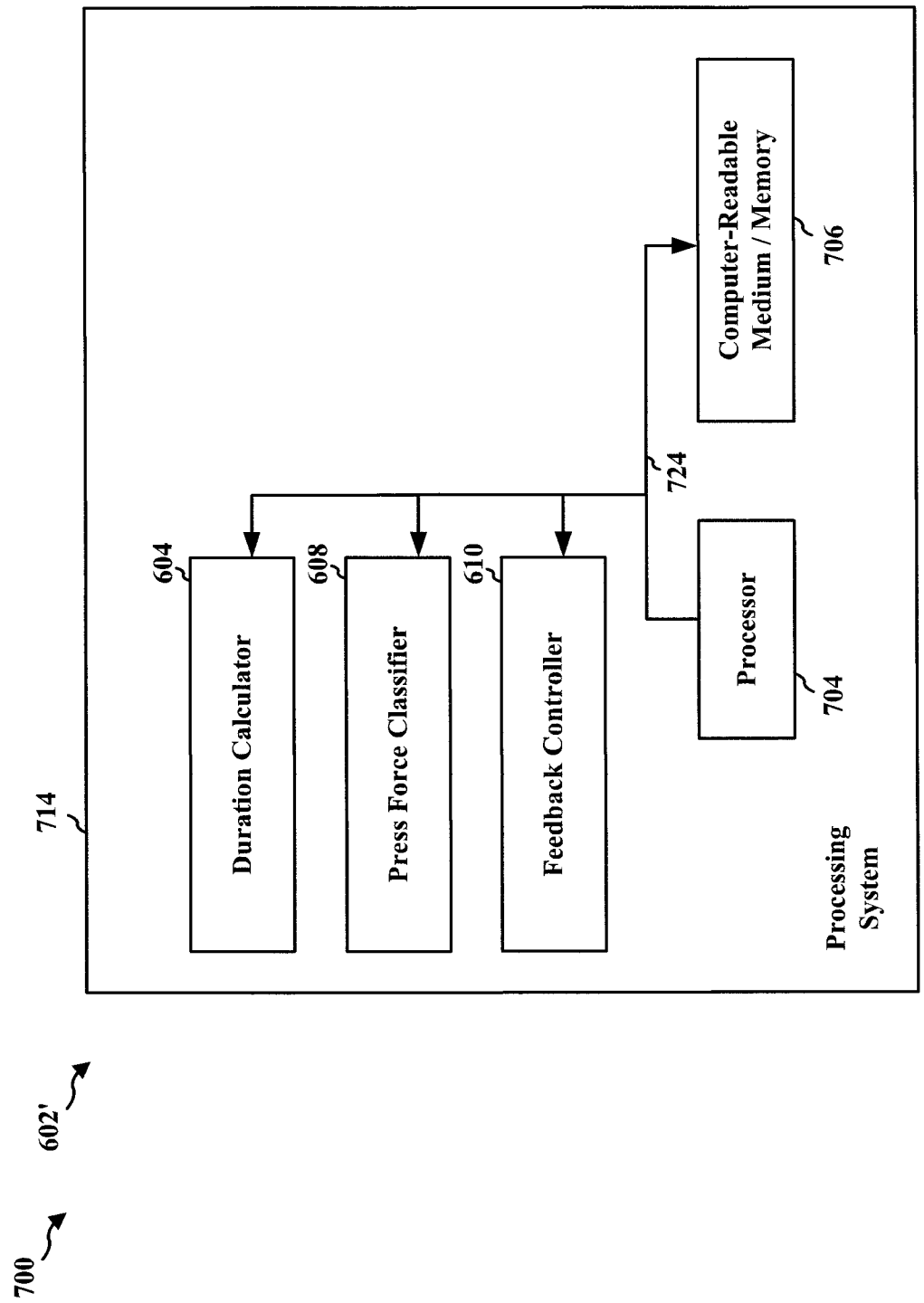
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 608, 610, and the computer-readable medium/memory 706. The bus 724 may also link various other circuits such as timing sources, peripherals, voltage regulators, and power management circuits, which are well known in the art, and therefore, will not be described any further.

The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 608, 610. The components may be software components running in the processor 704, resident/stored in the computer readable medium/memory 706, one or more hardware components coupled to the processor 704, or some combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B; and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of adjusting feedback parameters, the method comprising:
   determining a duration of pressing a button of a mouse input device based on a signal associated with the button, wherein the determining the duration of pressing the button comprises calculating the duration based on a start time, and an end time, wherein the start time is a first time a mouse button click signal enters into an active state after a debounce time, the debounce time being when a switch contact and a relay contact strike together as a result of the pressing of the button, and the end time is a second time instance at which the pressed button is released;
   classifying a press force applied on the button of the mouse input device into a category of a plurality of categories based on the duration; and
   adjusting a parameter of a feedback corresponding to the press force based on the category; and
   wherein the duration of pressing the button is determined without using a sensor to detect the press force.

2. The method of claim 1, wherein a movement of the mouse input device triggers the end time.

3. The method of claim 1, wherein the calculating is performed by a microcontroller of the mouse input device or by a program running on a computing device coupled to the mouse input device.

4. The method of claim 1, wherein the plurality of categories comprise a first category, a second category, and a third category.

5. The method of claim 4, wherein the press force is classified into the first category when the duration is shorter than a first threshold, wherein the press force is classified into the third category when the duration is longer than a second threshold, the second threshold being greater than the first threshold, wherein the press force is classified into the second category when the duration is longer than or equal to the first threshold but shorter than or equal to the second threshold.

6. The method of claim 5, wherein at least one of the first threshold and the second threshold is pre-determined, configurable, or adaptable through machine-based learning.

7. The method of claim 1, wherein the feedback is at least one of a haptic feedback or a lighting feedback, wherein the parameter is at least one of a vibration intensity of the haptic feedback, a color intensity of the lighting feedback, or a light duration of the lighting feedback.

8. An apparatus for adjusting feedback parameters, comprising:
   a memory; and
   at least one processor coupled to the memory and configured to:
      determine a duration of pressing a button of a mouse input device based on a signal associated with the button, wherein the determining the duration of pressing the button comprises calculating the duration based on a start time, and an end time, wherein the start time is a first time a mouse button click signal enters into an active state after a debounce time, the debounce time being when a switch contact and a relay contact strike together as a result of the pressing of the button, and the end time is a second time instance at which the pressed button is released;
      classify a press force applied on the button of the mouse input device into a category of a plurality of categories based on the duration; and
      adjust a parameter of a feedback corresponding to the press force based on the category;
      wherein the duration of pressing the button is determined without using a sensor to detect the press force.

9. The apparatus of claim 8, wherein a movement of the mouse input device triggers the end time.

10. The apparatus of claim 8, wherein the apparatus is a microcontroller of the mouse input device or a computing device coupled to the mouse input device.

11. The apparatus of claim 8, wherein the plurality of categories comprise a first category, a second category, and a third category.

12. The apparatus of claim 11, wherein the press force is classified into the first category when the duration is shorter than a first threshold, wherein the press force is classified into the third category when the duration is longer than a second threshold, the second threshold being greater than the first threshold, wherein the press force is classified into the second category when the duration is longer than or equal to the first threshold but shorter than or equal to the second threshold.

13. The apparatus of claim 12, wherein at least one of the first threshold and the second threshold is pre-determined, configurable, or adaptable through machine-based learning.

14. The apparatus of claim 8, wherein the feedback is at least one of a haptic feedback or a lighting feedback, wherein the parameter is at least one of a vibration intensity of the haptic feedback, a color intensity of the lighting feedback, or a light duration of the lighting feedback.

15. A non-transitory computer-readable medium storing computer executable code, comprising instructions for:
   determining a duration of pressing a button of a mouse input device based on a signal associated with the button, wherein the determining the duration of pressing the button comprises calculating the duration based on a start time, and an end time, wherein the start time is a first time a mouse button click signal enters into an active state after a debounce time, the debounce time being when a switch contact and a relay contact strike together as a result of the pressing of the button, and the end time is a second time instance at which the pressed button is released;
   classifying a press force applied on the button of the mouse input device into a category of a plurality of categories based on the duration; and
   adjusting a parameter of a feedback corresponding to the press force based on the category;
   wherein the duration of pressing the button is determined without using a sensor to detect the press force.

16. The non-transitory computer-readable medium of claim 15, wherein the plurality of categories comprise a first category, a second category, and a third category, wherein the press force is classified into the first category when the duration is shorter than a first threshold, wherein the press force is classified into the third category when the duration is longer than a second threshold, the second threshold being greater than the first threshold, wherein the press force is classified into the second category when the duration is longer than or equal to the first threshold but shorter than or equal to the second threshold.

\* \* \* \* \*